United States Patent Office 3,412,178
Patented Nov. 19, 1968

3,412,178
ETHYLENE COPOLYMER
Francis E. Brown, Orange, Tex., assignor, by mesne assignments, to Gulf Oil Corporation, Pittsburgh, Pa., a corporation of Pennsylvania
No Drawing. Filed Apr. 16, 1964, Ser. No. 360,422
5 Claims. (Cl. 260—897)

ABSTRACT OF THE DISCLOSURE

Copolymers of ethylene and 2-allyloxymethyl-2-ethyl-1,3-propanediol are prepared by a high pressure free-radical catalyst polymerization process and the copolymers so prepared are employed to render a polyolefin resistant to the accumulation of a static electric charge.

---

This invention relates to copolymers of ethylene and, in a particular aspect, deals with the use of such copolymers to suppress the build-up of a static electric charge on shaped articles and films of polyolefins.

In accordance with my invention, I have now discovered novel copolymers of ethylene and 2-allyloxymethyl-2-ethyl-1,3 propane diol (trimethylolpropane mono-allyl ether). These novel copolymers comprise recurring units of the structure

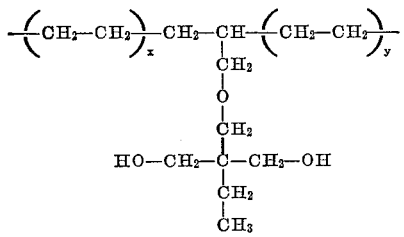

wherein $x$ and $y$ are positive integers.

The aforesaid novel copolymers are normally solid thermoplastic substances which are useful in a wide variety of applications such as chemically-resistant coatings, intermediates in the preparation of thermoplastic resins having specially modified properties, and in the production of various shaped articles and films such as are frequently prepared from the commonly known polyolefins.

A specially unique and advantageous use of the aforesaid novel copolymers is as anti-static agent for incorporation the various polyolefin resins such as, for example, polyethylene, polypropylene, poly-4-methyl-1-pentene and the like in minor effective amounts, e.g. from 1–25 wt. percent, to prevent the accumulation of static electric charges upon the surface of such polyolefins. The prevention of the accumulation of static charges upon the surfaces of such polyolefins is desired in order to suppress the accumulation of dust, etc.. on such surfaces, for example, upon the surfaces of bottles and other shaped articles and film packages when displayed for sale in stores.

The novel copolymers aforedescribed are prepared in accordance with my invention by techniques generally similar to those known in the art for the preparation of polyethylene in the so-called "high-pressure" free-radical catalyzed polymerization process. Thus the novel copolymers can be prepared by continuously contacting a feed stream comprising ethylene and the 2-allyloxymethyl-2-ethyl-1,3 propane diol (hereinafter termed the "comonomer") with a free-radical generating polymerization initiator in a polymerization zone at a polymerizing pressure, generally above 10,000 p.s.i.g. and typically above 18,000 p.s.i.g., and at a polymerizing temperature generally above 200° F. and typically from about 300 to about 500° F. The polymerization mixture comprising the copolymer of ethylene and comonomer is continuously withdrawn from the polymerization zone at a rate substantially equal to the feed rate of ethylene and comonomer and the product is recovered and unreacted monomers are recycled to the polymerization zone.

The free-radical generating polymerization initiator employed can, in general, be any of the common initiators heretofore employed in the polyethylene processes of the prior art, for example, the "per" compounds such as the peracetates and the perbenzoates, for example, tertiarybutyl peracetate and tertiarybutyl perbenzoate, the acyl peroxides, including the diacyl peroxides, for example, lauroyl, decanoyl and caprylyl peroxide, or ditertiarybutyl preoxide, the azo catalysts such as for example $\alpha,\alpha'$ azobisisobutyronitrile, and other known free-radical generating ethylene polymerization initiators such as tertiarybutylperoxypivalate. At present, it is generally preferred to employ such initiators which have relatively short half-lives, suitably in the range of from 5 to about 50 minutes and desirably from about 20 to about 40 minutes at 185° F. as determined by the method of Dehnert and Mageli, Modern Plastics 36, p. 142 (February 1959), although, under suitable conditions, initiators having considerably longer half-lives for example up to 218 hours at 212° F. can be successfully employed. The initiators are introduced into the polymerization zone in a conventional manner, for example, by dissolving the initiator in a suitable solvent and injecting the initiator solution directly into the polymerization zone.

As in the heretofore-known polyethylene processes, adjustments in the properties of the copolymer such as density, molecular weight, inherent viscosity, etc., can be effected to a limited extent by adjusting the various process parameters such as a pressure, temperature, residence time, the use of telogens, for example, propane or various aldehydes such as butyraldehyde, and the use of polymerization inhibitors for example, the nuclearly-substituted phenols such as 2,6-ditertiarybutyl methyl phenol, or 4,4' methylenebis (2,6-ditertiarybutyl phenol), 2,6-ditertiarybutyl-4-ethyl phenol and the like according to techniques which are known in the polymerization art.

Of course, the comonomer content of the copolymer can be controlled by adjusting the comonomer content of the feed to the polymerization zone. The comonomer content in the feed required to produce a copolymer having a specific comonomer content will depend somewhat upon the specific catalyst and the specific reaction conditions employed, and the determination of the exact amount of comonomer in the feed required to produce a particular copolymer can be accomplished by routine experimentation by persons of ordinary skill having regard for the invention herein disclosed.

The following examples illustrate a preferred method for preparing the copolymers of my invention.

In each example a feed mixture comprising ethylene and comonomer is continuously introduced under pressure and at a temperature of 100° F. through a feed inlet into the top of a stirred polymerization reactor. The polymerization initiator is continuously introduced into the reactor and mixed with the feed at a point adjacent to the feed inlet. A thermocouple positioned at the confluence of the feed and initiator streams measures the "initiation temperature." The initiation temperature is controlled by regulating the ratio of initiator to feed. Other components of the polymerization mixture, such as telogens, inhibitors, and the like are premixed with the feed immediately prior to introducing it into the reactor.

The polymerization mixture comprising copolymer and unpolymerized feed is withdrawn from the bottom of the reactor through a "let-down" valve at a rate substantially equal to the feed rate. The pressure within the reactor is controlled by regulating the pressure drop across the let-down valve. The copolymer is separated and recovered from the polymerization mixture and unpolymerized feed is recycled to the feed inlet.

Example 1

A feed stream of ethylene and comonomer, containing 0.74 mol. percent comonomer, is continuously polymerized as aforesaid under a pressure of 15,800 p.s.i.g. while maintaining an initiation temperature of 350° F. The catalyst employed is decanoyl peroxide injected into the reactor at a rate of 0.00015 mol. per mole of ethylene-comonomer feed.

The copolymer so produced had the following properties:

| | |
|---|---|
| Mole percent comonomer | 1.72 |
| Density | .9498 |
| Inherent viscosity | 0.41 |
| Vicat softening temperature, ° C. | 67.5 |
| Tensile at break, p.s.i. | 725 |
| Percent elongation | 10 |

Example 2

A feed stream of ethylene and comonomer, containing 0.032 mol. percent comonomer, is continuously ploymerized as aforesaid under a pressure of 14,500 p.s.i.g. while maintaining an initiation temperature of 325° F. The catalyst employed is decanoyl peroxide injected into the reactor at a rate of .000038 mol. per mole of ethylene-comonomer feed.

The copolymer so produced had the following properties:

| | |
|---|---|
| Mole percent comonomer | .053 |
| Density | .9266 |
| Inherent viscosity | 1.031 |
| Vicat softening temperature, ° C. | 105 |
| Tensile at break, p.s.i. | 2030 |
| Percent elongation | 560 |

Example 3

A feed stream of ethylene and comonomer, containing .225 mol. percent comonomer, is continuously polymerized as aforesaid under a pressure of 20,200 p.s.i.g. while maintaining an initiation temperature of 325° F. The catalyst employed is decanoyl peroxide injected into the reactor at a rate of .0000182 mol. per mole of ethylene-comonomer feed.

The copolymer so produced had the following properties:

| | |
|---|---|
| Mole percent comonomer | 0.619 |
| Density | .9344 |
| Inherent viscosity | 1.067 |
| Vicat softening temperature, ° C. | 108.3 |
| Tensile at break, p.s.i. | 1840 |
| Percent elongation | 560 |

Example 4

This example illustrates the use of the copolymer of the invention as an anti-static agent.

A portion of the copolymer prepared in Example 1 was blended with a film-grade polyethylene resin in a Banbury mixer. The blend contained 20 wt. percent copolymer. Samples of the blend and of the polyethylene (for comparison) were extruded under identical conditions into 2 mil film. These films were rubbed with wool and placed over a dish of ashes, the ashes being ¾" away from the film. The polyethylene control film picked up a multitude of ashes but the copolymer film had zero ash pick-up.

Example 5

This example illustrates the effectiveness of the copolymer as an anti-static agent in an injection molding resin and that the copolymer can be incorporated into the base resin by dry-blending, followed by injection molding.

A portion of the copolymer of Example 1 in the form of diced cubes was dry-blended with diced polyethylene injection molding resin to produce a dry-blend containing ten wt. percent copolymer. This dry blend and a sample of the polyethylene base resins (for control purposes) were fabricated into molded trays by injection molding techniques. The trays were rubbed with wool and placed over a dish of ashes as in Example 4. The tray fabricated from the base resin containing no comonomer picked up a substantial quantity of ashes while the tray fabricated from the resin containing the copolymer had substantially zero ash pick-up. The test and control trays were then subjected to the maximum electrostatic charge from a Tesla coil and the charge was allowed to dissipate for two minutes before the trays were again placed over the ash dish. Again, the control tray picked up a substantial quantity of ashes while the tray fabricated from the polyethylene-copolymer blend of Example 1 had substantially zero ash pick-up.

Example 6

A six hundred gram sample of the copolymer of Example 1 was emulsified by the following technique:

The sample was pre-swollen in a solvent (Perchloroethylene) and then passed through a Mantin-Gaulin homogenizer for two hours in the presence of 6,000 c.c.'s water, 6,000 c.c.'s solvent and 400 c.c.'s emulsifier (Du Pont "WAQE"). The resulting emulsion was concentrated to approximately 20% solids by vacuum distillation.

A copper wire was heated to red-heat in a bunsen flame and then immediately dipped into the concentrated emulsion. Upon cooling, the coated wire was immersed in concentrated nitric acid to observe the degree and tenacity of coating. For comparison, a similar emulsion of a copolymer of ethylene and methyl acrylate was prepared and used to coat another piece of copper wire in the same manner. The nitric acid into which the wire coated with the ethylene-methyl acrylate copolymer was immersed, turned distinctly green (copper nitrate) within only a few minutes. However, the nitric acid in which the wire coated with the copolymer of Example 1 was immersed remained colorless for over an hour, indicating that the copolymer of Example 1 completely coated the wire and gave excellent protection against chemical attack.

The pendant hydroxyl groups in the copolymers of my invention afford convenient sites for further modifying the characteristics of the copolymer. In general, they will undergo any of the reactions commonly known for alcoholic hydroxyl groups such as esterification, etherification, oxidation, and so forth, for example, the formation of xanthates and acetals and reaction with isocyanates, diisocyanates and epoxides.

Having described my invention and the preferred embodiments thereof, I claim:

1. A normally solid copolymer of ethylene and 2-allyloxymethyl-2-ethyl-1,3 propane diol comprising recurring units of the structure

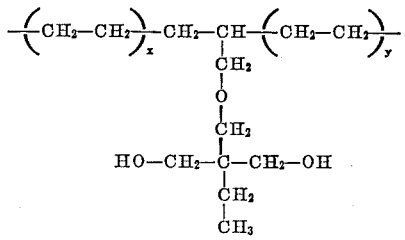

wherein $x$ and $y$ are positive integers.

2. A composition comprising a poly-1-monoolefin and the copolymer of claim 1.

3. Composition of claim 2 wherein said polyolefin is polyethylene.

4. The method of rendering a poly-1-monoolefin resistant to the accumulation of a static electric charge comprising incorporating therein a minor effective amount of the copolymer of claim 1.

5. The composition of claim 2 wherein the olefin employed in preparation of the polyolefin is selected from the group consisting of ethylene, propylene and 4-methyl-1-pentene.

References Cited

UNITED STATES PATENTS

| Re. 24,062 | 9/1955 | Horton | 154—139 |
|---|---|---|---|
| 3,268,484 | 8/1966 | Costanza et al. | 260—91.1 |
| 2,545,689 | 3/1951 | Dannenber et al. | 260—91.1 |
| 2,839,430 | 6/1958 | Rimmer | 117—139.5 |
| 3,141,908 | 7/1964 | Calfee | 260—88.1 |
| 3,153,680 | 10/1962 | Giustiniani et al. | 260—897 |
| 3,195,975 | 7/1965 | Cappuccio | 260—897 |
| 3,226,455 | 12/1965 | Matsubayashi et al. | 260—897 |
| 3,267,085 | 8/1966 | Shouse et al. | 260—88.1 |

FOREIGN PATENTS

Hayer, Mason: American Dyestuff Reporter, pp. 368–371 (June 7, 1954).

Shashoua, J. Ply. Sci. A: 1, pp. 169–187, 1963 (pp. 169, 176, 177, 183 and 184 relied on).

MURRAY TILLMAN, *Primary Examiner.*

T. FIELD, *Assistant Examiner.*